March 8, 1960 G. SLAYTER ET AL 2,927,621
APPARATUS FOR PRODUCING CURLY GLASS FIBERS IN MAT FORM
Filed Aug. 6, 1956 11 Sheets-Sheet 3
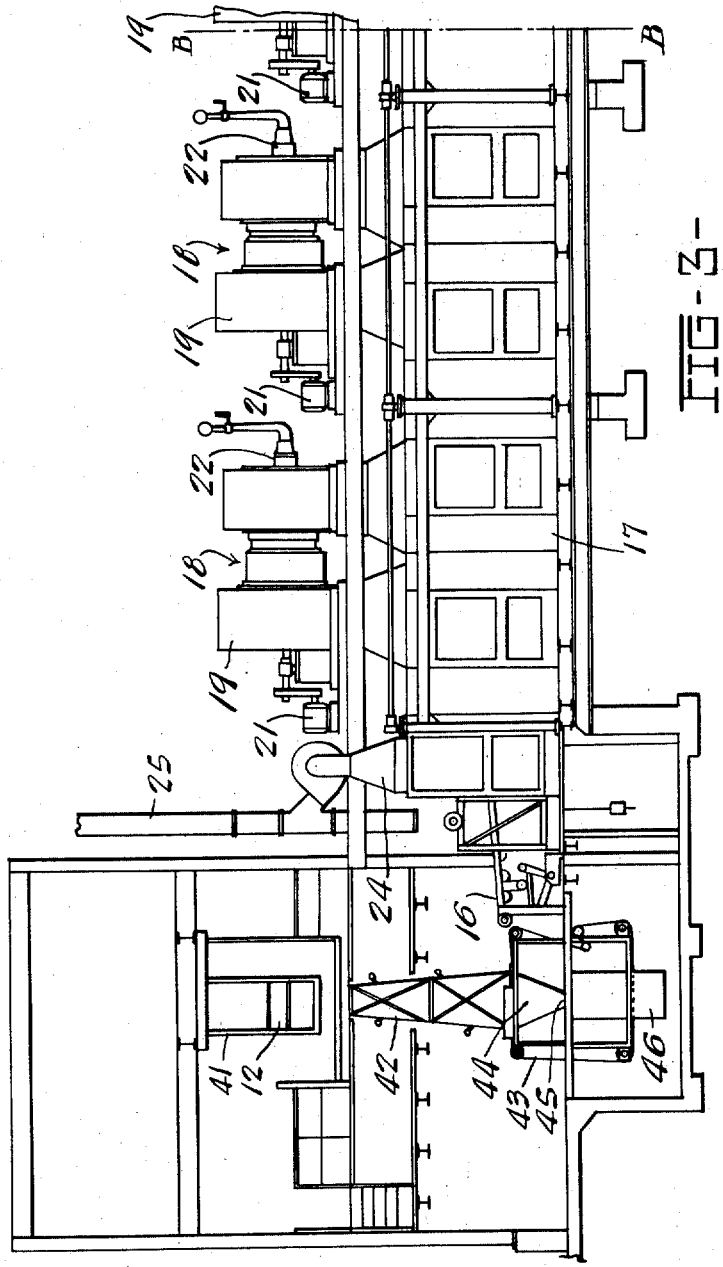
INVENTORS:
GAMES SLAYTER.
CHARLES B. WARDEN.
BY ROBERT C. MERCER.
ATTYS.

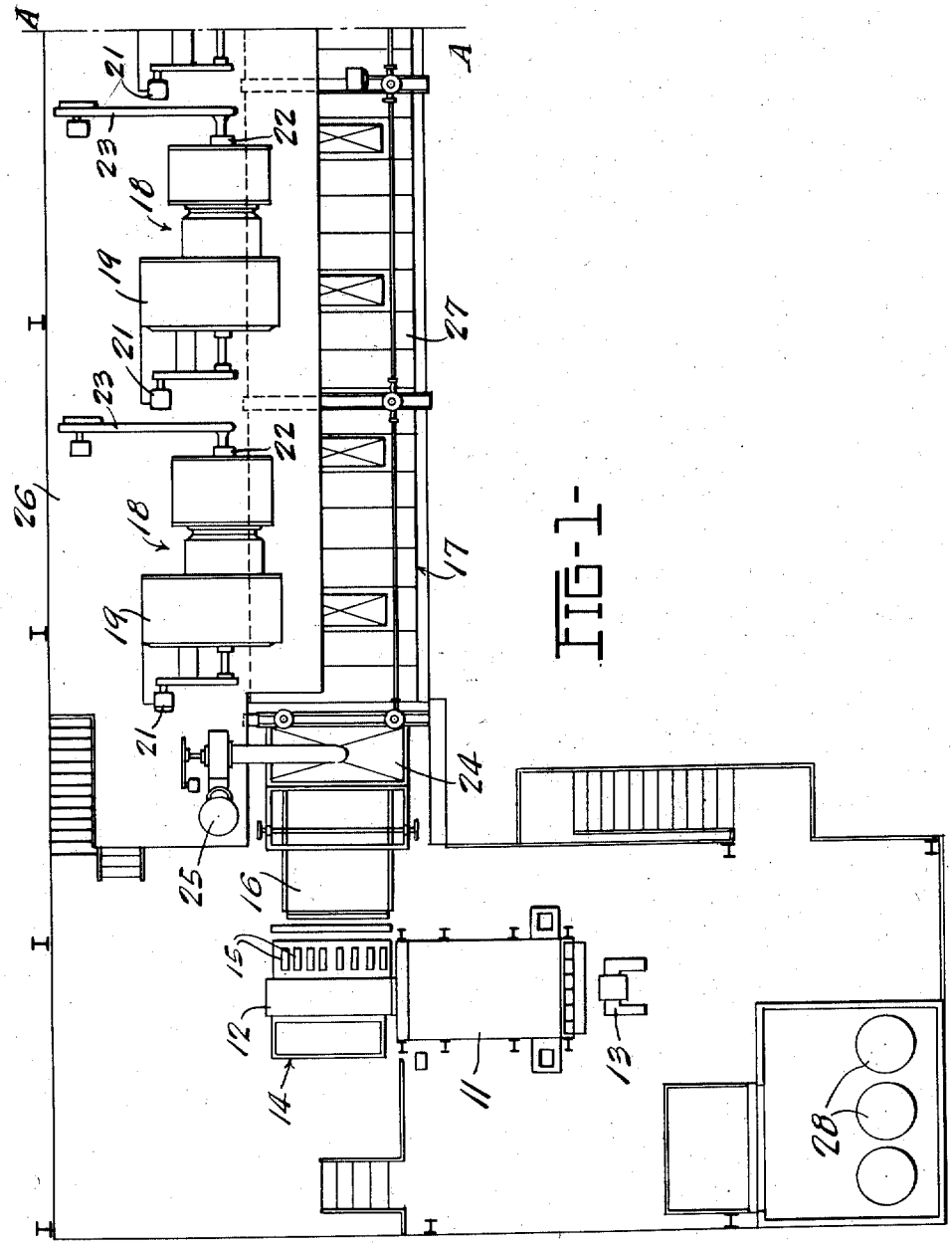

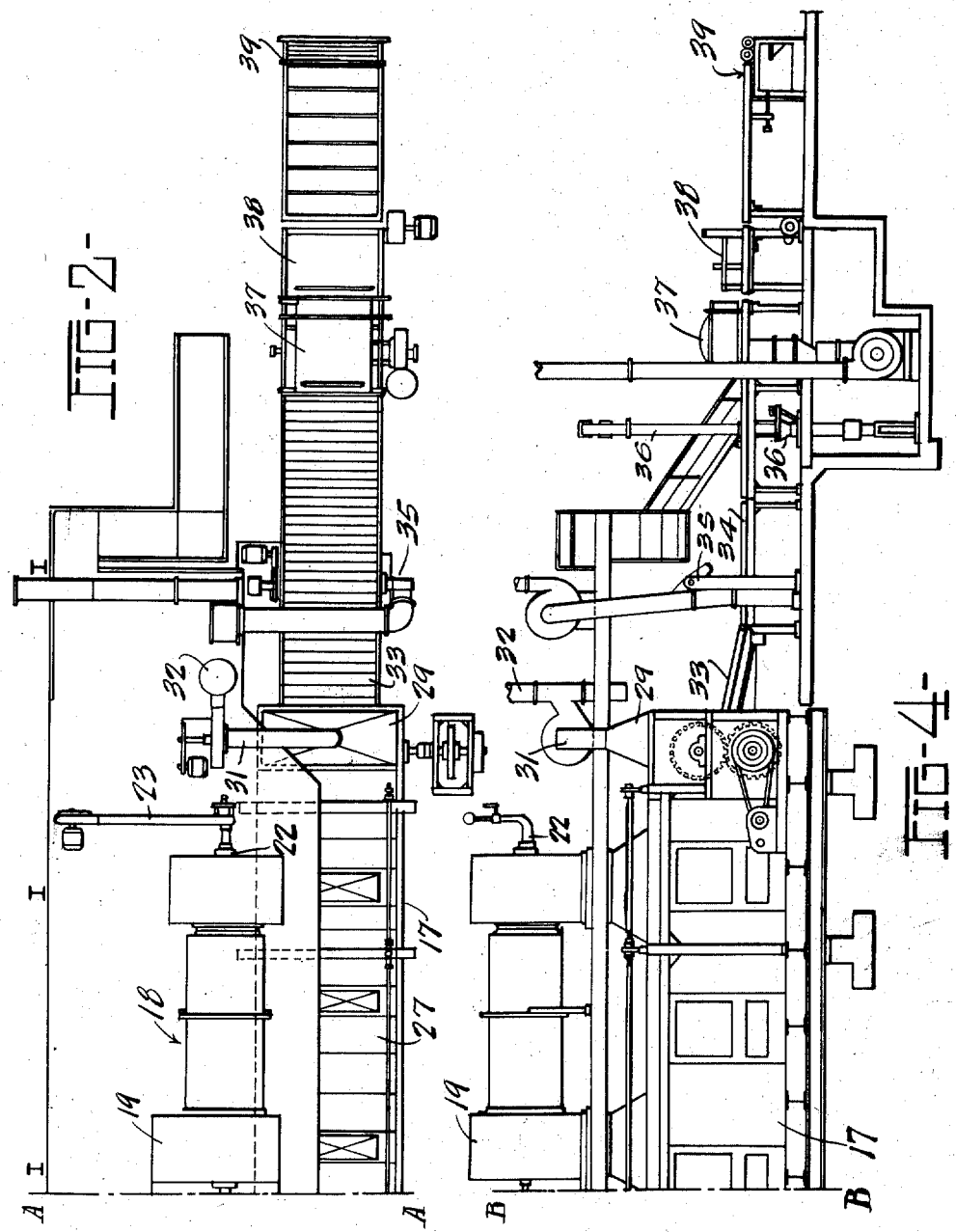

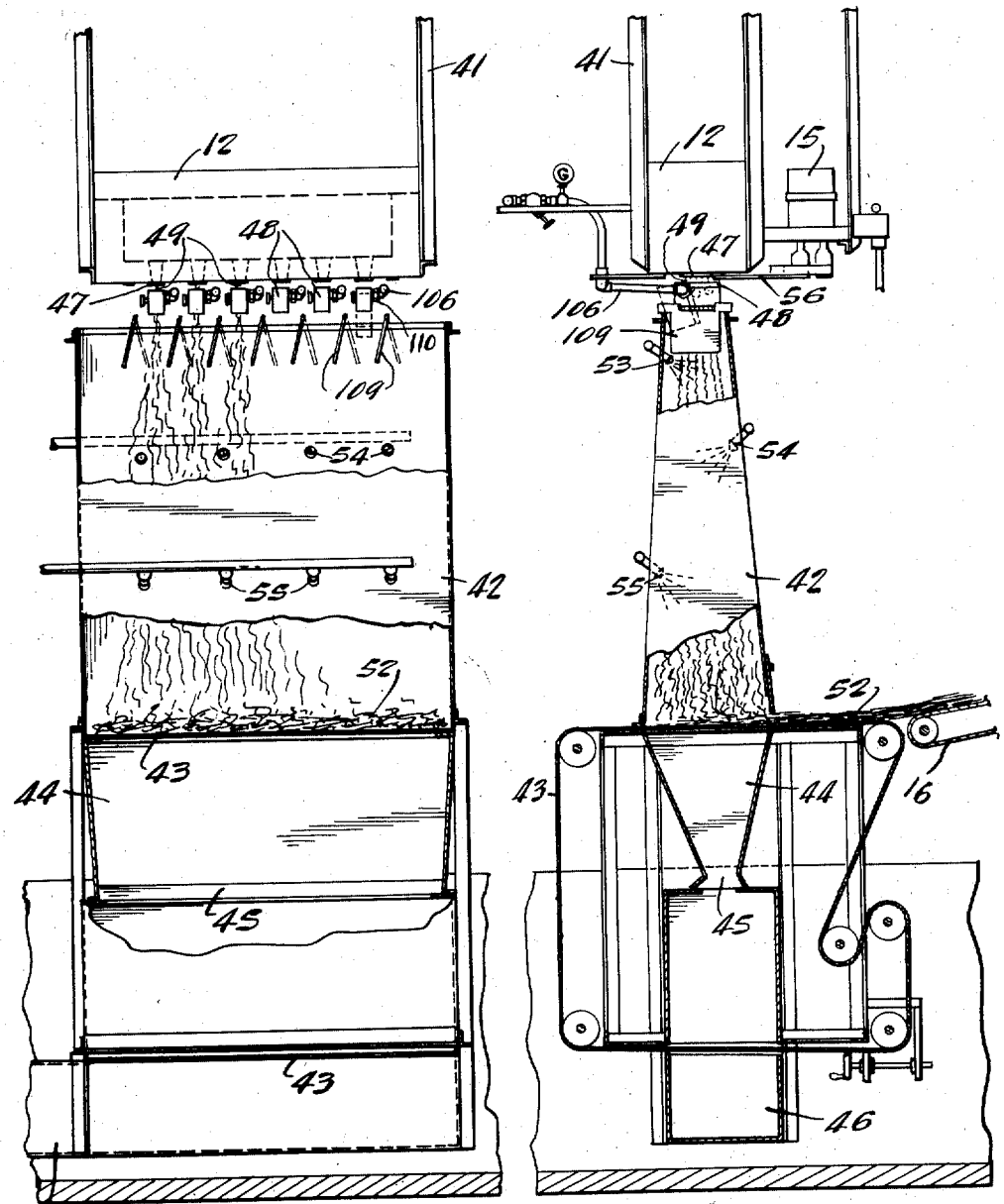

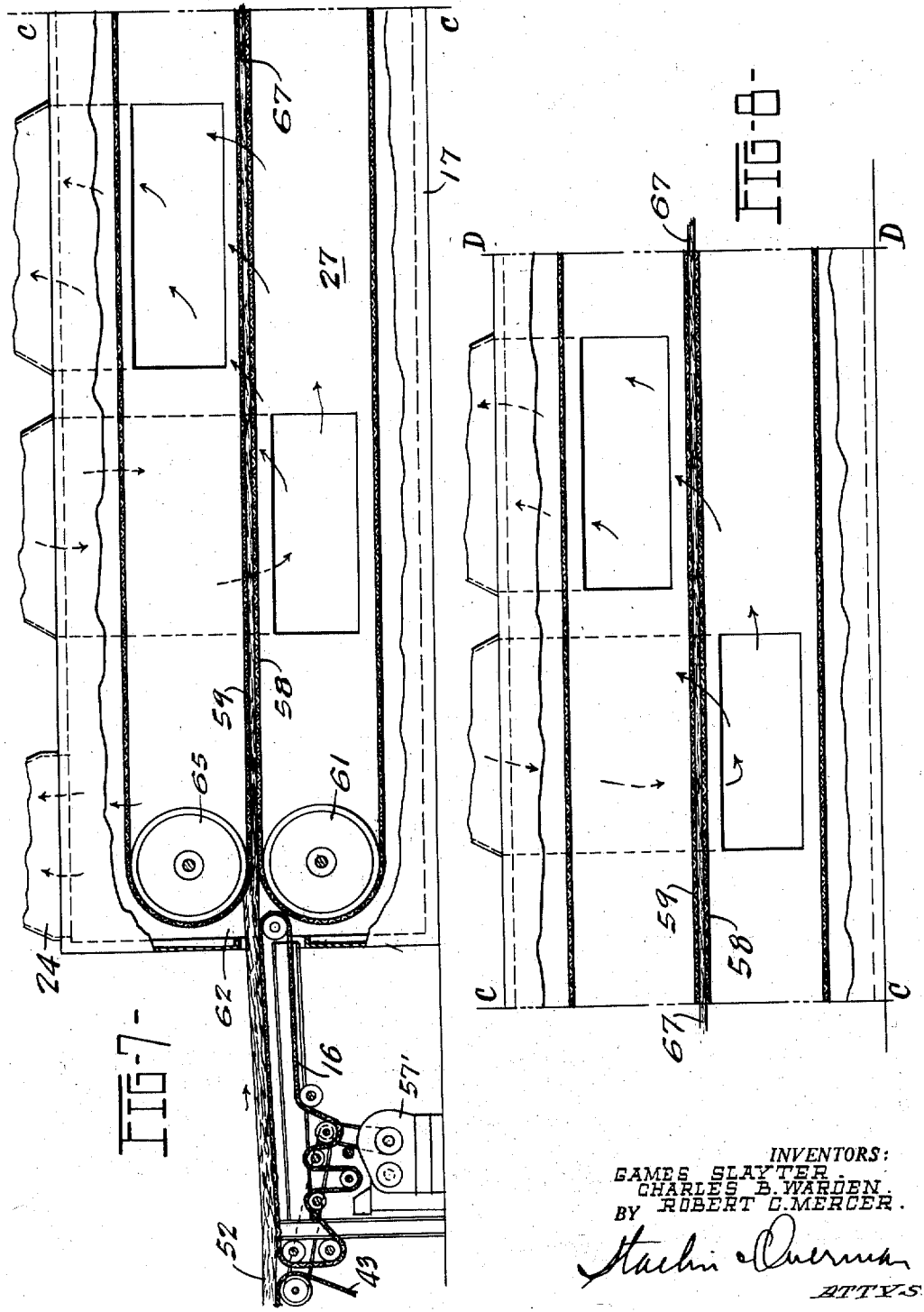

March 8, 1960  G. SLAYTER ET AL  2,927,621
APPARATUS FOR PRODUCING CURLY GLASS FIBERS IN MAT FORM
Filed Aug. 6, 1956  11 Sheets-Sheet 6
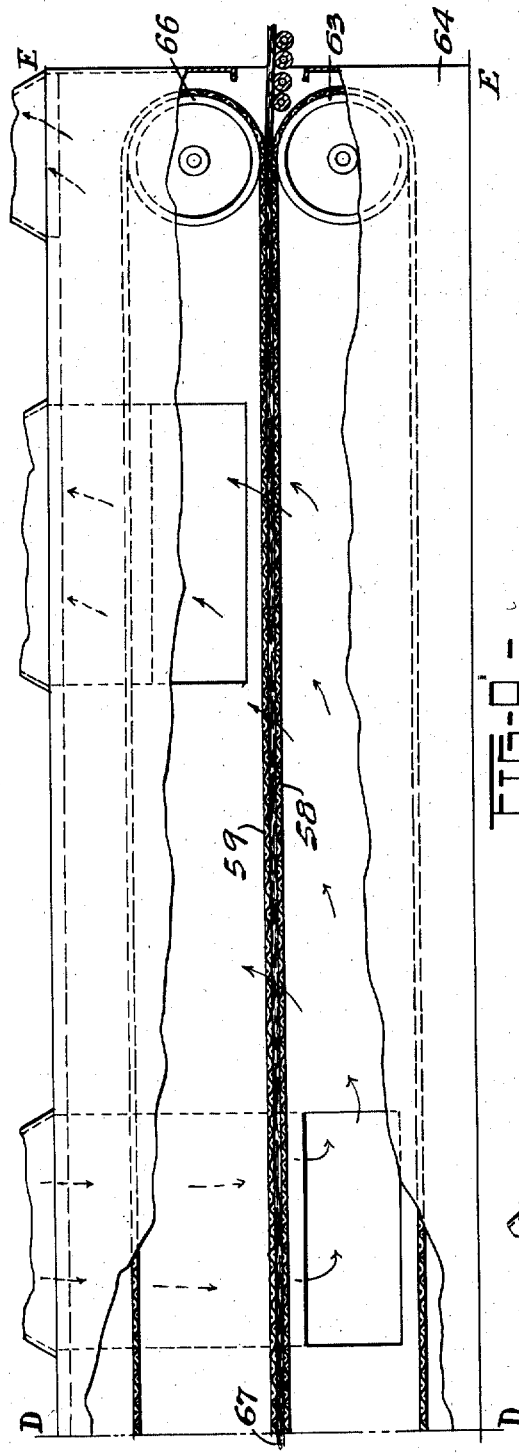
FIG-9-
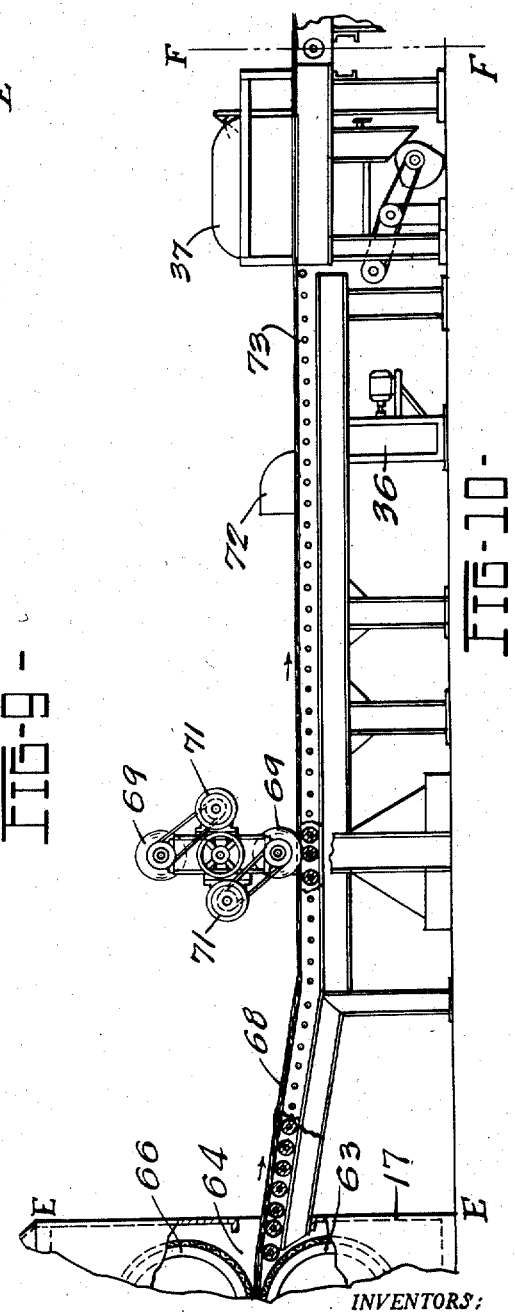
FIG-10-
INVENTORS:
GAMES SLAYTER.
CHARLES B. WARDEN.
BY ROBERT C. MERCER.
ATTYS.

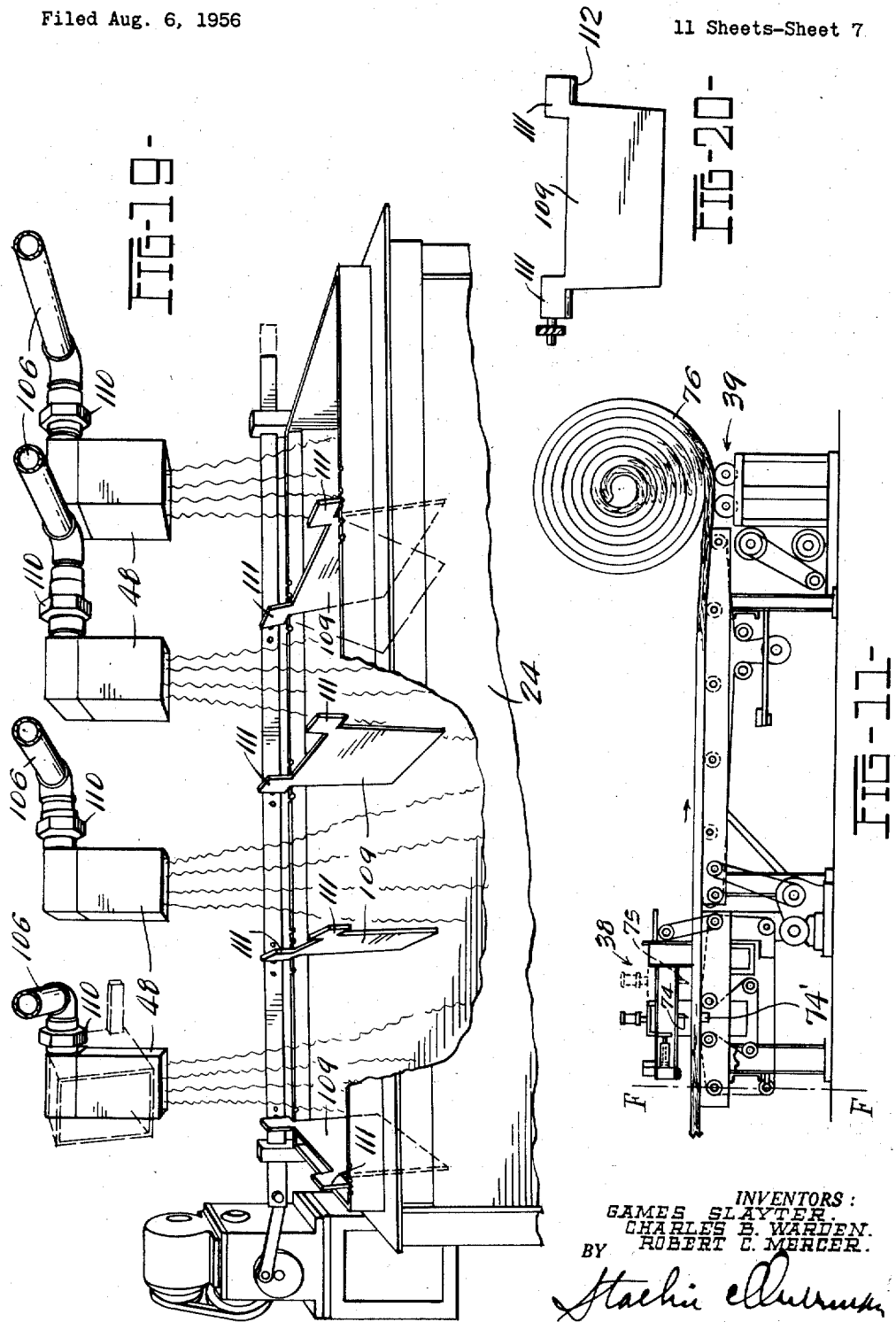

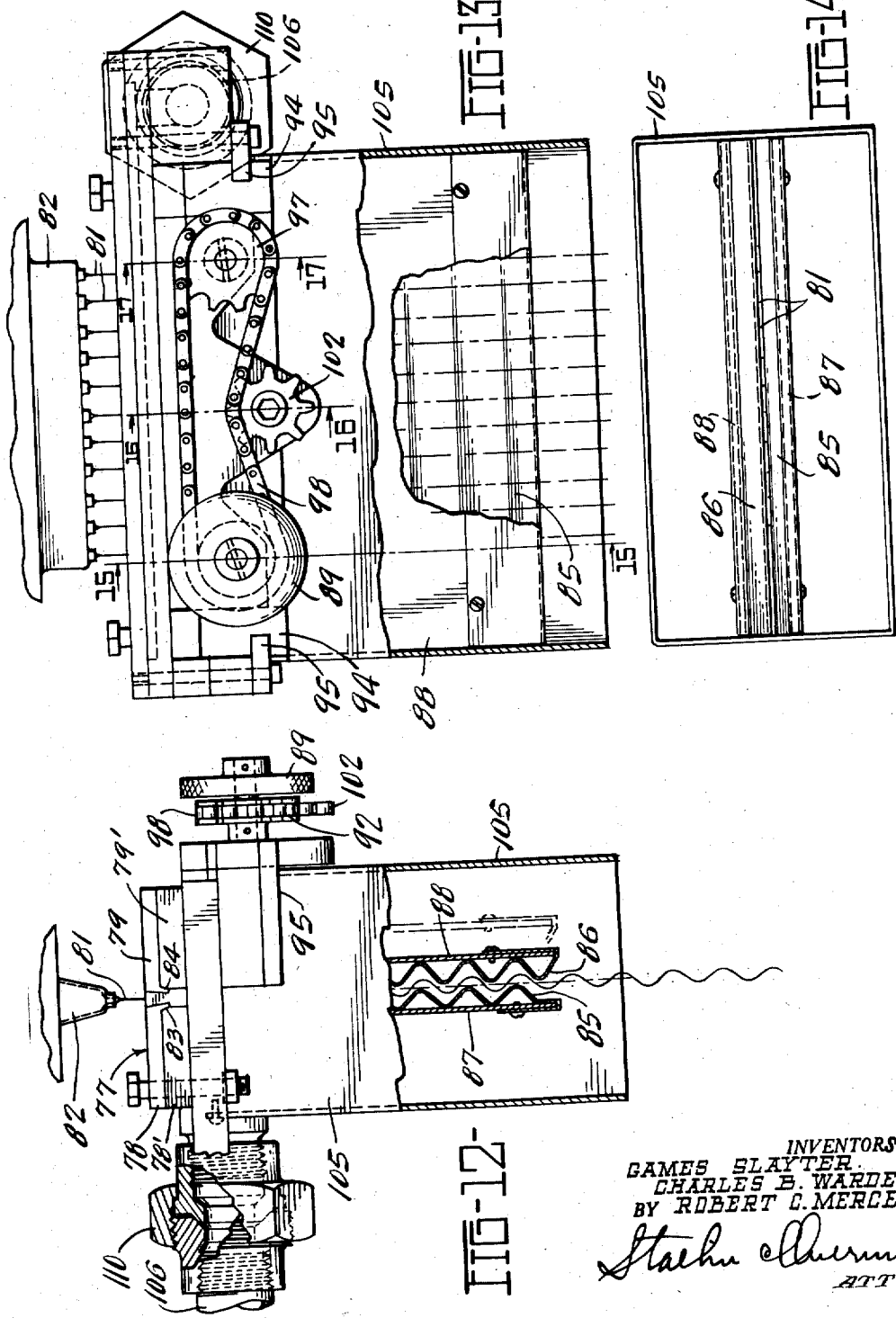

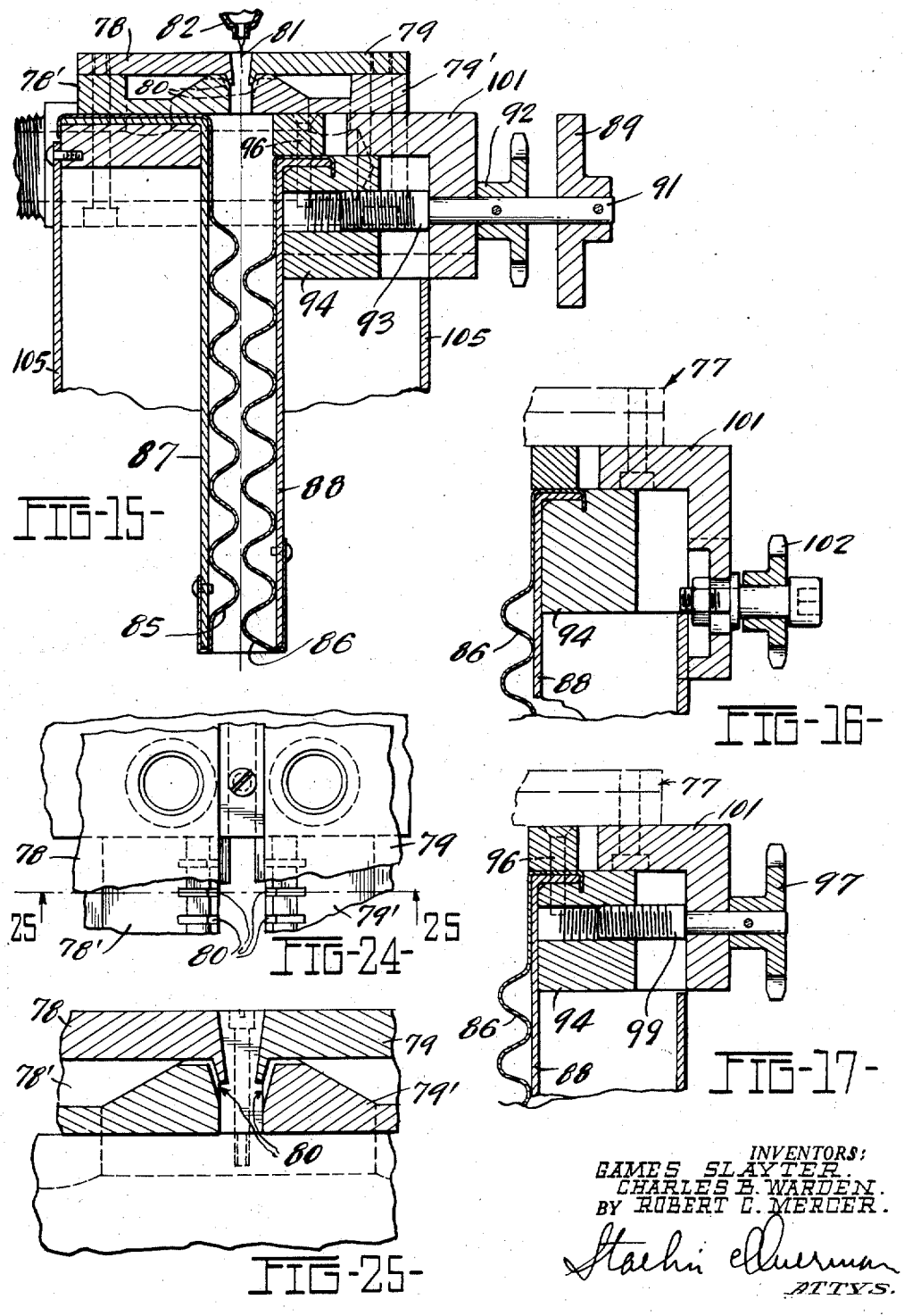

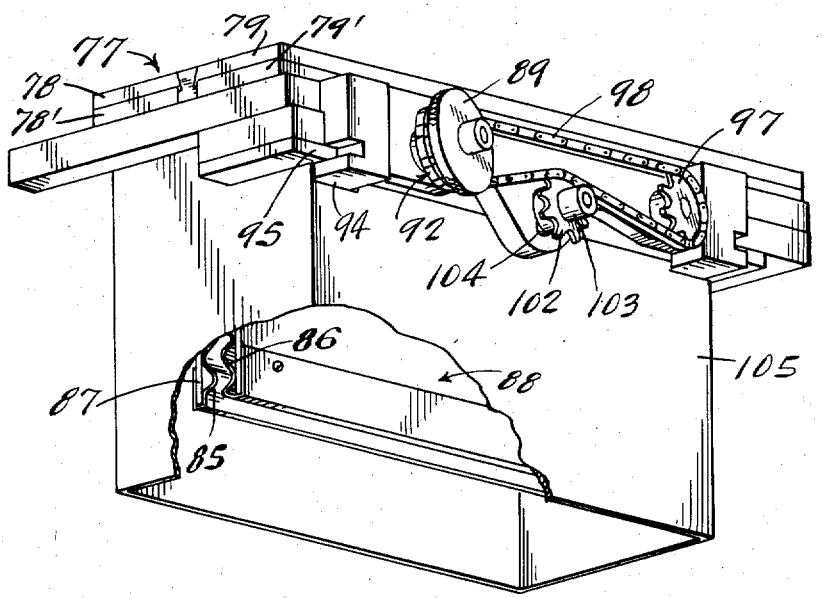
FIG-18-

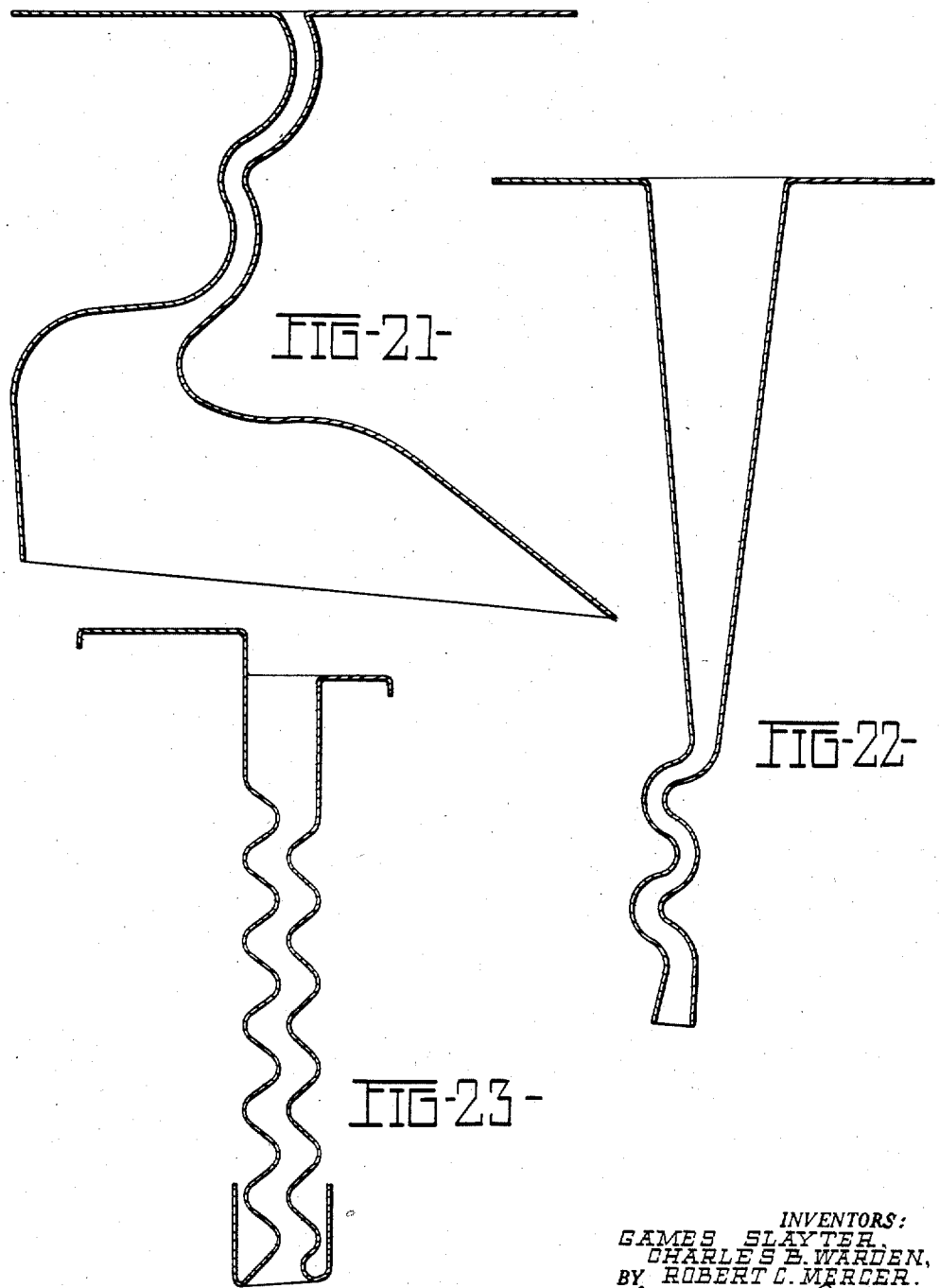

United States Patent Office 2,927,621
Patented Mar. 8, 1960

2,927,621

APPARATUS FOR PRODUCING CURLY GLASS FIBERS IN MAT FORM

Games Slayter, Charles B. Warden, and Robert C. Mercer, Newark, Ohio, assignors to Owens-Corning Fiberglas Corporation, a corporation of Delaware Application August 6, 1956, Serial No. 602,264

9 Claims. (Cl. 154—1)

This invention relates to flexible fiber and particularly to a resilient low density pack of fibers suitable for use as a filtering media or the like.

In the past, fibers of a heat-softenable material have been produced by various processes utilizing many different attenuating forces such as a blast of combustion gases from a burner, centrifugal forces generated by a spinner, mechanical forces provided by pulling wheels or collet winders, and steam or gaseous blasts. For example in the production of filtering media, a process formerly used comprised forming jackstraws of fibrous glass by attenuating streams of molten glass with a steam blast and collecting these jackstraws in the form of a mat which was then chopped into wafers of the desired size. A mat of these jackstraw fibers was not readily rolled and was generally considered for use only in the cut-to-size wafer form.

There has been a need for a flexible media which exhibits uniform high quality and which is easily rolled for shipment and subsequent use. Extreme resilience in a low density pack which has good integrity and strength has not been available in fibers produced in the past.

It is an object of this invention to provide a process for producing curly fiber.

It is a further object to produce a fluffy, low density pack of fibers having excellent resilience and integrity.

It is also an object to produce long, curly fibers of high quality which are substantially free of brashiness.

It is an object to provide a bonded fiber product having novel physical properties resulting from the characteristics of the fiber and the way in which the fibers are bonded one to another.

It is an object to provide an efficient, low operating cost process for the production of fiber and packs or mats of fibers, which mats are easily rolled, compressed and unrolled without loss of properties.

Other objects will be apparent from the description which follows.

In the drawings:

Figure 1 is a plan view of the forming end of apparatus for carrying out the invention including a part of the oven;

Figure 2 is a plan view of the oven and roll-up sections;

Figure 3 is an elevational view of that part of the apparatus shown in Figure 1;

Figure 4 is an elevational view of that apparatus shown in Figure 2;

Figure 5 is a front elevational view of the forming section, with certain parts broken away;

Figure 6 is a side elevational view of the same forming apparatus shown in Figure 5, with certain parts being broken away for the sake of clarity;

Figure 7 is an elevational view of the transfer conveyor and a part of the curing oven, certain portions being broken away;

Figure 8 is an elevational view of a part of the oven;

Figure 9 is an elevational view of the end of the oven;

Figure 10 is an elevational view of the slitter and adhesive applicator apparatus;

Figure 11 is an elevational view of the chopper and roll-up apparatus;

Figure 12 is a side elevational view, partly broken away, of the blower assembly;

Figure 13 is an elevational view, partly broken away, of the blower assembly;

Figure 14 is a bottom view of the blower assembly;

Figure 15 is a cross-sectional view on line 15—15 of Figure 13;

Figure 16 is a cross-sectional view on line 16—16 of Figure 13;

Figure 17 is a cross-sectional view on line 17—17 of Figure 13;

Figure 18 is a perspective view of the blower assembly;

Figure 19 is a perspective view of a bank of blower assemblies and the top of the hood partly broken away;

Figure 20 is a view of a wig-wag baffle plate;

Figure 21 is a view of one form of a skirt assembly;

Figure 22 is a view of another skirt assembly;

Figure 23 is a view of an additional skirt assembly;

Figure 24 is a plan view of a portion of a blower; and

Figure 25 is a sectional detail view on line 25—25 of Figure 24.

Fibrous glass and mats or packs of fibrous glass are produced with the apparatus shown in the drawings. Such fibers and packs of fibers have novel physical properties which have been formerly unattainable. It is now possible to produce long curly fibers which may be collected in the form of a pack that is fluffy and resilient and yet possesses high strength and good integrity. The long curly fibers are bonded together at their junctures in the low density pack so that the fibers act as spring elements when the pack is compressed or distorted and after the forces used to compress the pack are removed the fibers spring back to their original position and the pack recovers its original dimensions fully.

The novel features of the invention will be better understood with reference to the process of producing fibers and a mat or pack of fibers. In Figures 1 and 2 is shown a plan view of the over-all apparatus with the furnace, the fiber forming section, and part of the curing oven appearing in Figure 1 and the remainder of the oven and the chopper and roll-up sections being shown in Figure 2. Figures 3 and 4 show an over-all elevational view with the furnace and forming section, a part of the oven being shown in Figure 3 and the remainder of the oven and the chopper and roll-up section shown in Figure 4. In Figure 1 is shown the glass furnace 11 having a forehearth 12 and a batch feeding device 13. Transformers 15, 15 are shown adjacent to the forehearth 12. Next to the forming section, which has been designated by numeral 14, is a transfer conveyor 16 that introduces the material being formed into the curing oven 17. The curing oven 17 is a multi-section oven which is warmed with circulating heated air. The air heating units 18, 18 comprise a large fan in housing 19, which fan is driven by an electric motor 21. Gas burners 22 heat the air which is circulated through the sections of the oven. The burners 22 have gas inlets 23.

At the entrance to the curing oven 17 is a hood 25 which removes fumes through a stack 25. The curing oven comprises a tunnel 27 through which the material being cured passes. Above tunnel 27 is a platform 26 upon which the air heating and circulating equipment is mounted. In this manner the air heating units 18 are disposed above that section of the oven which the particular unit heats. On the furnace platform is shown mixing tanks 28, 28 which are used to prepare binder for spraying upon the product being formed.

At the exit end of the curing oven is a hood 29 which exhausts fumes from the exit end of the tunnel 27. The exhaust fumes are removed through duct 31 and then passed upwardly through stack 32 to the atmosphere.

In Figure 2 and Figure 4 is shown transfer conveyor 33 which removes the material emitting from the oven. A horizontal conveyor 34 comprising sections then passes the material being formed by slitter 35, crusher 36, adhesive applicator 37, chopper 38 and then to roll-up device 39.

In Figure 3 is shown the forming section in elevation. The forehearth 12 is suspended on frame 41 and disposed below the forehearth is hood 42 which has closed sides as shown in Figure 3 but which is open in the front and back at the lower half of the hood. A conveyor chain 43 is disposed over suction box 44. Air pulled through suction box 44 passes through suction slot 45 and then through suction duct 46.

In Figures 5 and 6 is shown forehearth 12 in the bottom of which are disposed a plurality of feeders 47, 47. Disposed below the feeders 47, 47 are blowers 48, 48. When this apparatus is operated, streams of glass 49 pass downwardly into the blowers 48 and these streams are attenuated into fibers 51 which are collected in the form of a pack 52 upon conveyor chain 43. As the fibers pass downwardly through hood 42, they are sprayed with a lubricant such as petroleum oil from guns 53 and with a resinous binder from guns 54 and 55. The oil guns are placed near the top of the hood 42 so that the fibers are coated with oil immediately after they are formed. The binder guns are disposed at two or more levels as shown in Figure 6 to assure a uniform dispersal of binder particles in the fibers passing downwardly to the conveyor chain 43. As the pack 52 forms, the binder filters out upon the fibers in the pack and much of the binder collects at the junctures between contacting fibers. Feeders 47 are connected by bus bars 56 to transformers 15.

In Figure 7 is shown the entrance to curing oven 17. The transfer conveyor 16 is provided with an electric motor 57' which drives the conveyor. Inside tunnel 27 of curing oven 17 are disposed two conveyors 58 and 59 sometimes referred to as flights. The conveyors are mounted upon rolls which are disposed in the end zones of the curing oven 17. Drum 61 in the entrance zone 62 and drum 63 in the exit zone 64 support conveyor 58. Drum 65 in the entrance zone 62 and drum 66 in the exit zone 64 support conveyor belt 59. As the pack 52 passes between drums 61 and 65, the thickness of the pack is reduced as shown in Figure 7 with a resulting compressed pack 67 being formed.

In Figure 10 is shown the cured compressed pack 68 emitting from curing oven 17. The pack first passes under a slitter which comprises a number of rotating disclike blades 69 driven by electric motor 71. The blades are mounted side by side at the proper spacing so that the borders of the pack 68 are trimmed and as many strips of material are formed as may be desired across the width of the pack emitting from the oven. The blades and motors are mounted upon a turret as shown in Figure 10 so that a choice may be made between two or more settings of the spaced blades with little down time being necessary. The top blades may be reset at the desired spacing while the bottom blades are being used and then the turret may be revolved to place the blades which were in the top position down in the operating position.

As the pack 68 proceeds forward, the borders which have been trimmed from the pack are deflected into crusher 36 by suitable deflecting members 72. The material so removed is crushed and used as an admix back in the forming section of this process or in other fiber making processes. Depending upon the number of blades 69 which are used, one or more straight edged strips of product proceed into adhesive applicator 37. Herein a suitable material is sprayed upon the pack in order to coat the fibers with a material which may be needed in subsequent use of the products. For instance, a dust collecting material such as tricresyl phosphate is sprayed upon the pack in a manner such that each of the fibers is coated with a film of the material and any excess is removed from the bottom of the conveyor 73 and recycled. Other oils may be sprayed by applicator 37. Mineral oils or various petroleum oils may be used as the spraying liquid. Flame retardant additives or accelerators may be included in the mineral oils used. Hydrated inorganic materials such as Viscosine which is believed to be a phosphate and is supplied by Borne-Scrymser Co. An emulsion of a mineral oil and a solution of a soluble borate such as sodium borate in water may be used as the treating material. A soluble borate designated by the Pacific Coast Borax Co. as FR–28 and believed to be sodium borate provides flame retardant properties to the oil.

The fibrous material then passes in to a chopper 38 shown in Figure 11. This chopper has a blade 74 which moves forward with the material being cut when the blade is in the down or cutting position. The blade advances to the position indicated by numeral 75 shown in dotted lines. This chopper can be set to cut any length of wafer desirable and it also can be set to cut only after a long strip of material is formed into a roll 76, such as shown in Figure 11.

The forward motion of the blade is braked or reduced to line speed by an over-riding clutch and the blade moves quickly to the initial starting position on the return stroke. The blade 74 is kept in alignment by vertical and horizontal rack bars and is actuated by air cylinders which cause the blade to bear upon a rubber pad 74' mounted in a channel on the cutting stroke and advance the blade in the direction of travel of the material being cut.

The blower and skirt assembly will now be described in more detail. In Figure 12 the blower and skirt assembly is shown. Blower 77 comprises two upper and two lower elements 78, 79 and 78', 79', respectively, which direct converging jets of a gas such as air downward from the blower to impinge upon molten streams of glass 81 flowing from feeder 82. The blower elements have a plurality of side by side slots 80 through which the gas passes in the form of jets, see Figure 24. About one hundred or more of these slots are disposed in each of the elements 78 and 79 at the nozzles 83 and 84. Disposed below the blower and attached thereto is a pair of skirts 85 and 86, see Figures 12 and 13. Ribbed skirts 85 and 86 have backing members 87 and 88 for added strength and reinforcement. The skirts 85 and 86 lie in a plane which is parallel to the center line of blower 77. The distance between the skirts is adjustable, skirt 86 being adjustably mounted so that it can be moved closer or further from skirt 85. The adjustment is accomplished by turning knurled wheel 89 which is pinned to shaft 91 as is sprocket 92. The end of shaft 91 is threaded to form a screw 93, see Figure 15. Screw 93 when turned by knurled wheel 89 moves element 94 on the guide and support 95, see Figures 12 and 13. Skirt 86 and its backing member 88 are secured to element 94 by screws 96, see Figure 15. Sprocket 92 is connected with sprocket 97 by chain 98. Sprocket 97 is pinned to screw 99 so that when the sprocket is turned, element 94 is moved on guide 95 with respect to clip 101. An idler sprocket 102 is used to take up the slack in chain 98. Shaft 103 of idler sprocket 102 is positioned within slot 104 as may be necessary to take up the slack in chain 98, see Figure 18. About the skirt assembly is a box 105 which acts as a housing for the blower assembly.

In Figure 19 a plurality of blower assemblies is shown in operating position above hood 24. Although four blowers are shown, six or more blowers may be used as desired, see Figure 5. Each of the blowers 48 is mounted upon an air inlet pipe 106 which has an air pressure gauge 107 and an inlet valve 108, see Figure 6. Disposed in the top of hood 24 are wig-wag baffles 109, 109. These wig-wag baffles 109, 109 are actuated by suitable linkage so that they pivot on supporting arms 111, 111. The supporting arms 111 have rounded bearing surfaces 112 which facilitate the rocking motion of the baffles.

In Figures 21, 22 and 23 are shown various forms of skirts which may be used in carrying out this invention. It will be recognized that each of these forms presents a curvilinear path which allows air or any other gas to flow smoothly therethrough as in laminar flow without forming eddies or whirlpools within the skirts. It will also be noted that the distance between the skirts at any point common to the opposed skirts is substantially equal to the distance at other common points. That is to say, the distance between the skirts remains substantially constant along the extent of the skirt assembly.

In operating the apparatus shown in the drawings, glass is melted in the furnace and allowed to flow into the forehearth where the temperature is maintained at from about 2150° to 2450° F. The feeders are maintained at a temperature of from about 2270° to 2475° F. The following glass composition, expressed in parts by weight, is used satisfactorily by maintaining the feeder temperature at about 2380° F.

| | Parts |
|---|---|
| $SiO_2$ | 65 |
| $Al_2O_3$ | 4 |
| CaO | 14 |
| MgO | 2.5 |
| $B_2O_3$ | 5.7 |
| $Na_2O$ | 8.2 |

The furnace and forehearth are brought to equilibrium operating conditions and then the glass is introduced into the blower assemblies by swinging the blowers into operating position. The blowers are pivoted upon the air inlet line and then the nut on the packing gland is tightened to position the blower with respect to feeder 47. The forehearth is provided with drain bushings disposed near the ends of the forehearth so that flow of molten glass through the forehearth can be maintained even though the feeders are not being used. When the power to the feeders is shut off, the glass congeals within the orifices and flow stops through the feeder itself. The drain bushings are normally kept operating during times of shut-downs unless the furnace is being rebuilt.

With the glass temperature in the forehearth at from 2350° to 2440° F. and with the feeders at from 2300° to 2450° F. the streams 49 flow from the feeders and into the blowers 48 which have been swung into position. When starting up a blower, the air is adjusted to from 70 to 100 pounds per square inch pressure. As soon as the blower is swung into operating position, fibers are pulled and blown downwardly into the hood. The blower is adjusted so that it is exactly square with the feeder and so that all fibers are pulled cleanly through the slot without touching the slot itself. The top of the blower is adjusted so that it is about one-quarter of an inch below the feeder case.

The skirts are then adjusted with respect to one another so that the fibers being produced are curly. In order to obtain curling of the fibers, it has been discovered that the crests of the waves of the skirts must be from ⅛ of an inch to ¼ of an inch apart. This distance is measured from the crests of one skirt to the crests of the opposing skirt. Since the clearance is necessary, it is apparent that the skirts are spaced from the center line drawn down between these skirts. With the skirts properly adjusted, a small stream of glass could conceivably flow between the skirts without touching the skirts as it falls; however, since the glass stream normally wavers in its path, it would no doubt contact the skirt somewhere along its fall. With the air coming through the blower, the glass streams are prevented from contacting the skirts when proper adjustment between the skirt and feeder is achieved. The glass streams ride in the air streams so that the glass is carried through the tortuous path with but only occasional contact, if any, of the fibers with the skirts or any part of the blower assembly. Since the glass streams ride in the air stream, it is very necessary to maintain laminar flow through the blower assembly. Any whirlpools or eddies would cause the glass to be distorted from its path, resulting in contact of the glass with the blower assembly or the skirts and a disruption of the operation.

Fiber diameter is controlled by adjustments of bushing temperature or blower pressure, or by changing the distance between the blower assembly and the feeder. To increase fiber diameter, the feeder temperature is raised in increments of from 10° to 20° F. until the proper diameter is achieved. The feeder temperature is preferably maintained within the working range of from about 2330° to 2450° F. To increase fiber diameter, the blower pressure may be reduced a few pounds per square inch as may be necessary to achieve the proper diameter. Another way to increase fiber diameter is to lower the blower with respect to the feeder. In order to decrease fiber diameter the bushing temperature is lowered or the blower pressure is raised or the blower is raised with respect to the feeder to achieve the proper spacing. Generally fibers having an average diameter of from about 70 to 175 one hundred thousandths of an inch are used in producing filter packs.

To overcome small differences in temperature along the feeder orifices, the blower may be slightly tilted to raise one end of the blower so that it is spaced a shorter distance from the feeder than the opposite end. The feeder acts as a heat removal device and the hot end of the feeder will be thus cooled by the proper positioning of the blower. Heat radiates from the feeder to the blower and by this means it is possible to cool one end of the feeder more than another by simply positioning the blower closer to the hot end of the feeder.

It has been found that the curl is increased when the skirts are moved closer to one another and the curl is decreased when the skirts are moved apart, one from the other. A critical minimum distance must be maintained, however, in order to operate successfully. If the skirts are moved too far apart, the fiber will not be curled and the skirts will simply act as a directing spout and not as a curling device. With the proper adjustment, the fibers are quite long with the average length being from 24 to 36 inches and a great majority of the fibers being 12 inches or more in length.

Long straight fibers can be combined with curly fibers by simply adjusting certain of the blower assemblies so that no curling takes place. Products having combined curly and straight fibers are desirable for some uses. Fibers which are about 18 inches long and have a wavy configuration with the wave length being from about ½ to 1 inch and the amplitude of from about ⅛ to ⅜ of an inch are desirable for producing a pack which is used as a filter media. The waves are not perfectly sinusoidal but neither are they in the form of a spiral. It appears that the waves do lie in various planes instead of in a single plane after the fibers are collected in a pack; the waves within a single fiber will lie in several planes and not in a single plane.

Fiber diameter preferably varies from about 100 to about 150 one-hundred thousandths of an inch. The apparatus shown will not produce fiber that is curled which is less than about 70 one-hundred thousandths of an inch in diameter. After the blower assemblies are in operating position, the wig-wag baffles 109 are commenced to oscillate to help provide a pack of uniform thickness and quality across the width of the conveyor. Differences in the appearance of the pack can be traced to two causes: an excess or scarcity of fibers in certain lanes or areas of the pack, or a difference in the degree of fiber curl from different feeders. Differences in blower pressure, differences in volumes of induced air, and differences in binder gun settings will also affect fiber distribution. The wigwag baffle plates are used to help reduce the non-uniformity which may result from these differences in settings.

After fiber formation is being satisfactorily carried out, oil guns 53, 53 are started to operate. Oil is introduced into the fibers near the top of the hood. This oil lubricates the fibers and thereby reduces breakage of fiber as it is collected and subsequently handled. The fibers do not abrade one another with the oil coating thereon and they are also protected against the deleterious effects of water or other such elements in the atmosphere. A very fine spray of oil is preferred and less than 0.5% by weight of the total product should be applied to give the lubricity and resistance to water which is desired. Lubricating oil is applied to the fibers to improve handleability, to reduce fly, and to reduce dusting in the finished products. An air atomizing gun is preferably used for applying the oil.

Binder is applied in the hood with a plurality of air atomizing guns. The fibers coming down in the hood are preferably sprayed from both the front and back of the hood, the binder guns being positioned so that the rear guns aim straight into the hood and the front guns angle downwardly toward the pack connected on the conveyor. The binder is preferably a 40% solids mixture of a 90:10 phenol-formaldehyde resin and Vinsol emulsion. Vinsol is a high melting point resin such as a pine rosin derivative, see Boden 2,324,758 and Hunter 2,276,304. When the proper amount of binder is being applied, the ignition loss will be from 35 to 40% of the total weight of binder and fibrous glass. A small proportion of a metal salt such as aluminum sulfate can be added to the binder to enhance the properties. Increased resiliency of the product is achieved. Furthermore, resistance to oxidation is imparted to the resin. As the fibers are collected upon the conveyor chain at the bottom of the hood, the particles of the binder emulsion filter out upon the fibers and distribute evenly throughout the pack. Instead of using a phenol-formaldehyde emulsion such as that described, various other resins likewise can be applied from the water emulsion state. Also powdered binders may be applied either alone or in conjunction with a spray of a binder emulsion. Binders in a solvent system may be applied, for instance, a resin in a solvent solution may be sprayed upon the fibers after they are formed.

The fibers and resin binder after being collected in a pack form are introduced into an oven, such as that shown, to cure the resin binder. Heated air is preferably used to cure the binder which has been applied to the fibers. When using a phenolic emulsion such as that described, the temperature of the oven may be maintained at from about 350° to 370° F. The oven is shown in three zones and it may be desirable, depending upon the product being produced, to vary the temperature within the zones. For instance, one of the ovens may be maintained at a temperature of about 370° F. and another of the ovens at about 355° F. or the first zone may be maintained at 330° F. and the latter two at 350° F. The binder may be used in proportions of from about 15 to 30% by weight of binder on the total weight of product. The height of the pack of fibers may be reduced and maintained at the desired thickness while the binder is being cured by the use of a pair of flights, see the drawings.

After the binder is cured, the material emitting from the oven advances past the slitter which cuts the material into strips and trims off the edges, and through an adhesive applicator wherein an adhesive material is applied, if desirable, and then through a chopper which cuts off the desired lengths of material. The adhesive applicator is adapted for applying such materials as petroleum oil or a dust-catching adhesive such as tricresyl phosphate in proportions of from 10 to 30% of the adhesive based on the weight of the cured product. Various other dust-catching materials may be applied at this point for adapting the product as a filtering media. For instance, hydrated inorganic materials such as a product labeled Viscosine and supplied by Borne-Scrymser Company of Elizabeth, New Jersey may be used. Also mineral oils with flame-retardant additives or the like may be used. The chopper may be by-passed if it is desirable to form a roll of material which can be used in a filtering apparatus wherein it is desirable to advance a clean portion of the filtering medium as it becomes clogged with dust or other dirt. In this type of apparatus, a roll of the filtering pack is payed out as necessary in order to present a clean filtering surface as the filtering pack becomes clogged with dirt.

Instead of the petroleum oil which is added at the top of the hood to provide necessary lubricity and fiber protection, it is sometimes desirable to spray silicone oil over the top of the hood. Good wet strength is thereby attained in the fiber pack.

When using a resin such as a phenol-formaldehyde binder, a rigid juncture is produced in the pack where fibers contact other fibers. All of the flexibility in the pack results from bending of the fibers between junctures and the rigid bonded junctures remain intact.

Various other resins may be used as the binder. For instance, white binders which may be applied include modified phenol-formaldehyde resins, melamine resins, urea-formaldehyde resins and the like. Whatever binder is used, it is known that it is desirable to have good binder flow since the junctures of the fibers are rather far apart and in order to achieve proper bonding, the binder particle must travel to and collect at the junctures where it is cured to give the necessary bond. A binder recovery system can be used if it is desirable to do so. Such a system may be incorporated into the suction box below the conveyor or collector chain. It is desirable to use a suction box below the collector chain to reduce air currents above the collection surface. Some back pressure does develop within the hood; however, it is preferable to reduce this back pressure to a minimum. It is necessary to balance this back pressure problem against the problem of applying too much suction with the result that the fibers are embedded into or pulled through the conveyor or collecting chain.

The density of the products may vary widely; however, the apparent density of filter media products generally varies from about 0.1 to 0.9 pound per cubic foot and preferably from about 0.3 to 0.5 pound per cubic foot.

The skirts may be fabricated from various materials. Metals are generally used and it has been found that soft metals such as tin, brass, and various sheet metals are especially adapted for this use.

Various modifications may be made within the spirit and scope of the following claims.

We claim:

1. Apparatus for producing fibers of a heat-softenable material comprising a feeder having orifices through which said heat-softenable material flows in the form of molten streams, disposed below said feeder a blower having a slot through which said molten streams flow, attached to said blower a pair of opposed, side-by-side skirts which define a confining passage below said slot, said blower having opposed nozzles for directing converging jets of an attenuating gas through said confining passage, said skirts being corrugated with the crest of one skirt being opposite a trough of the opposed skirt.

2. In apparatus as defined in claim 1 means for adjusting the position of said blower with respect to said feeder for controlling the heat loss from said feeder.

3. The apparatus of claim 1 wherein the skirts have sufficient length whereby the molten streams cool sufficiently while following the confining passage between said opposed side by side skirts to set the fibers formed from said streams in a curled condition.

4. Apparatus for producing fibers comprising a blower having opposed nozzles and a slot therebetween, a pair of opposed skirts butted against said blower and disposed to define a passage below said slot, said nozzles having openings arranged to direct converging jets of a fluid into said passage, and each of said skirts having a corrugated configuration arranged so that the distance between the opposed skirts remains constant throughout the extent of said passage.

5. Apparatus for producing fiber of a heat-softenable material comprising an elongated feeder having side-by-side orifices through which said heat-softenable material flows in the form of molten streams, disposed below and spaced from said feeder an elongated blower having a slot through which said molten streams flow, said blower being adjustably mounted to allow proper positioning of said blower with respect to said feeder.

6. Apparatus of claim 5 including means for pivoting said elongated blower to place one end of said blower at a shorter distance from said feeder than the opposite end of said blower to control heat transfer from said feeder.

7. Apparatus for producing curly fibrous glass in the form of a pack of intermeshed and bonded fibers comprising a plurality of side by side feeders from which molten glass flows in streams, disposed below each of said feeders a slotted blower through which the streams of molten glass from the feeder flow and are attenuated into fibers, attached to each of said blowers opposed skirts having identical waved configurations, the crest of one skirt being opposite a trough of the opposed skirt, between which skirts the fibers being formed are cooled to a non-plastic curled state as they pass therethrough, a hood, open at the top and bottom, disposed below the feeders and blowers for confining the fibers formed, a collecting belt at the bottom of said hood and disposed in the top of said hood, oscillating baffle means for distributing the fibers uniformly upon said collecting belt.

8. In fiber producing apparatus a blower comprising opposed space-apart nozzles which provide converging blasts, a slot between said nozzles for the passage of inspirated air, glass and said converging blasts, attached to said blower a pair of opposed, side by side skirts which define a passage below said slot, said skirts having similar waved configurations, a crest of one skirt being opposite a trough of the opposed skirt.

9. Fiber forming apparatus comprising a blower having opposed, spaced-apart nozzles that emit converging blasts of attenuating gas, a slot between said nozzles for the passage of streams of molten glass, a pair of opposed, spaced-apart skirts which define a passage below said slot for the attenuating gas and fibers being formed, said skirts being corrugated with a crest of one skirt being opposite a trough of the opposed skirt, and associated with said skirts oscillating baffle plates for directing the path of the gases from said blower and for distributing the fibers entrained therein.

References Cited in the file of this patent

UNITED STATES PATENTS

| | | |
|---|---|---|
| 2,189,822 | Thomas et al. | Feb. 13, 1940 |
| 2,224,466 | Baker et al. | Dec. 10, 1940 |
| 2,230,272 | Slayter | Feb. 4, 1941 |
| 2,313,630 | Dockerty | Mar. 9, 1943 |
| 2,331,945 | Von Pazsiczky et al. | Oct. 19, 1943 |
| 2,579,984 | Trowbridge | Dec. 25, 1951 |
| 2,610,893 | Collins et al. | Sept. 16, 1952 |
| 2,722,718 | Siu | Nov. 8, 1955 |

FOREIGN PATENTS

| | | |
|---|---|---|
| 1,117,767 | France | Mar. 6, 1956 |